United States Patent Office 2,745,747
Patented May 15, 1956

2,745,747

WINE FINING

Kurt Hennig, Geisenheim (Rhine), Germany

No Drawing. Application February 4, 1953,
Serial No. 335,157

5 Claims. (Cl. 99—48)

The present invention relates to a process for fining vinous and like beverages. It is applicable to red wine, white wine, fruit wine such as that produced from apples, pears, as also cherries, currants, gooseberries, strawberries and to sweet juices produced from all these fruits or from grapes.

In Germany, the law permits so-called blue fining of wine by the addition thereto of potassium ferro-cyanide. The law stresses, however, that the quantity of additive must be so controlled that no free cyanic compounds remain in the wine.

It can happen, however, due to inadvertance or mistake, that too much ferro-cyanide is added and that the wine is excessively fined as a result of which cyanic acid separates off. Such a wine is spoilt and cannot be sold.

In other countries such as France, the Union of South Africa, Switzerland, and the United States, the blue fining of wine is prohibited for these reasons.

The present invention provides a process for fining wine and like beverages, including unfermented grape juice, which is greatly superior to blue fining in that it excludes any possibility of over fining which spoils the wine and renders it unusable.

The fining or improving agent can be added to the beverages in any quantity without the danger of overfining them or rendering them unsuitable for human consumption.

The process of the invention comprises adding to the wine or like beverage an inositol compound and filtering after a given reaction time.

All those inositol compounds may be used which are capable of forming complex compounds of heavy metals. Among these are inositol phosphate ester and salts thereof; and more particularly the tetra- to hexaphosphate esters and their salts from which can be derived the least soluble compounds in the shortest time. It should also be noted that inositol esters of acids other than phosphoric acid also form complex compounds with salts of heavy metals (iron, copper, zinc, manganese). The preferred substance is calcium inositol acid tetraphosphate which, when used in accordance with the present invention, most rapidly yields an almost insoluble complex compound.

Calcium inositol acid tetraphosphate, calcium hexaphosphate of inosistol, or the magnesium, potassium or sodium compound of the acid tetra-, penta- or hexaphosphate of inositol are insoluble or at most not readily soluble in water, but they are capable of forming complex compounds with heavy metals which can be separated from the solution by filtration.

Heavy metals, such as iron, the presence of which is undesirable in wine or like beverages because of the cloudiness they cause and of the consequent effect on the commercial value, are combined with the inositol compound to form complex compounds capable of being removed from the wine by filtration at the same time as the added inositol compounds.

As a consequence of the practical insolubility of the added inositol compounds, there is no critical proportion of the additive to the wine, nevertheless the quantity will be advantageously held down to that which is sufficient, for example, for removing the iron present in the wine. In individual cases, there is no difficulty in ascertaining, by suitable preliminary tests, the quantity of inositol compound necessary for forming a complex compound with all the heavy metals present in the wine.

Wine has a normal iron content of 5 to 10 milligrams per liter resulting from the flow of sap or juice in the fruit. A content of 10 to 20 milligrams of iron per liter occurs very seldom and in only those cases where the grapes are substantially contaminated by contact with soil, or where the wine has been in direct contact with iron. Wines containing more than 20 milligrams per liter of iron are quite exceptional, and this high content would result only from lack of caution by the vintner who has allowed the wine to come into contact with iron, for example, with equipment or containers made of iron.

It has been ascertained by experiment that 20 grammes of inositol compound is necessary as the safe quantity for a normal iron content. Thus, 20 grammes of inositol compound is the normal quantity of additive, but this quantity can be increased up to 60 grammes per hectolitre without having any harmful effect on the wine.

The vintner can ascertain by a simple reaction whether the fining operation has been effective, and if the result is insufficient the treatment can be repeated with a further quantity of additive. The reaction is carried out on a small quantity of wine in a test tube, which is first acidified with hydrochloric acid and then tested with a drop of a solution containing 5 grammes of ferrous potassium cyanide and 5 grammes of ferric potassium cyanide for 100 cubic centimeters of water. A slight pale green coloration will indicate that the fining operation has been sufficiently performed.

The treatment will be continued over a period of time which depends primarily on the nature of the wine, and it will extend on an average from a minimum of eight days to a maximum of 14 days.

In a preferred embodiment of the process according to the invention, an inositol compound, for example calcium inositol acid tetraphosphate, is mixed to the consistency of a thin paste or slurry in some of the beverage to be treated, and the slurry is then added to the beverage and intimately and uniformly mixed therewith, for example by stirring, circulating etc.

The process according to the invention may be combined with other fining processes, such as by adding known clarifying agents, among these the natural or synthetic tanning materials, e. g. tannin, as also gelatin, thereby to break down and eliminate cloudiness.

After a relatively short time sufficient for the reaction, the beverage is allowed to stand for a while and then decanted or filtered. The fining process according to the invention has excellent results without any possibility of spoiling as with blue-fining.

Example 1

One thousand liters of wine having a normal iron content is fined with 20 grammes of calcium inositol tetraphosphate per hundred liters. Thus 200 grammes of inositol compound must be added to the total quantity of wine. The desired quantity of additive is first weighed and then mixed in a container with a small quantity of wine, which is then added to the batch of wine to be fined. The contents of the barrel is then thoroughly circulated. After eight days, the wine can be decanted from the fining sediment or filtered through a thick layer of filter material.

Example 2

One thousand liters of wine having a normal iron content is fined with 20 grammes of calcium inositol pentaphosphate per hundred liters. Thus 200 grammes of inositol compound must be added to the total quantity of wine. The desired quantity of additive is first weighed and then mixed in a container with a small quantity of wine, which is then added to the batch of wine to be fined. The contents of the barrel is then thoroughly circulated. After ten days, the wine can be decanted from the fining sediment or filtered through a thick layer of filter material.

Example 3

One thousand liters of wine having a normal iron content is fined with 20 grammes of calcium inositol hexaphosphate per hundred liters. Thus 200 grammes of inositol compound must be added to the total quantity of wine. The desired quantity of additive is first weighed and then mixed in a container with a small quantity of wine, which is then added to the batch of wine to be fined. The contents of the barrel is then thoroughly circulated. After twelve days, the wine can be decanted from the fining sediment or filtered through a thick layer of filter material.

Example 4

One thousand liters of wine having a high iron content is fined with 50 grammes of calcium inositol tetraphosphate per hundred liters. Thus 500 grammes of inositol compound must be added to the total quantity of wine. The desired quantity of additive is first weighed and then mixed in a container with a small quantity of wine, which is then added to the batch of the wine to be fined. The contents of the barrel is then thoroughly circulated. After eight days, the wine can be decanted from the fining sediment or filtered through a thick layer of filter material.

Example 5

One thousand liters of wine having a high iron content is fined with 50 grammes of calcium inositol pentaphosphate per hundred liters. Thus 500 grammes of inositol compound must be added to the total quantity of wine. The desired quantity of additive is first weighed and then mixed in a container with a small quantity of wine, which is then added to the batch of wine to be fined. The contents of the barrel is then thoroughly circulated. After ten days, the wine can be decanted from the fining sediment or filtered through a thick layer of filter material.

Example 6

One thousand liters of wine having a high iron content is fined with 50 grammes of calcium inositol hexaphosphate per hundred liters. Thus 500 grammes of inositol compound must be added to the total quantity of wine. The desired quantity of additive is first weighed and then mixed in a container with a small amount of wine, which is then added to the batch of wine to be fined. The contents of the barrel is then thoroughly circulated. After twelve days, the wine can be decanted from the fining sediment or filtered through a thick layer of filter material.

Although the invention has been described with particular reference to certain examples, it is obvious that the quantity set forth therein may be varied within the broad limits indicated, and that the scope of the invention is in no way limited thereby.

What is claimed is:

1. The process of fining vinous and fruit beverages including the group consisting of grape wine, fruit wine, grape juice, fruit juice and must, containing at least one contaminating heavy metal, comprising adding to one of said beverages an inositol compound selected from the group consisting of calcium salt of inositol tetraphosphate, calcium salt of inositol pentaphosphate, calcium salt of inositol hexaphosphate, magnesium salt of inositol tetraphosphate, magnesium salt of inositol pentaphosphate, magnesium salt of inositol hexaphosphate, potassium salt of inositol tetraphosphate, potassium salt of inositol pentaphosphate, potassium salt of inositol hexaphosphate, sodium salt of inositol tetraphosphate, sodium salt of inositol pentaphosphate, sodium salt of inositol hexaphosphate, mixed salts thereof, and mixtures thereof for reacting with the heavy metal to form a substantially insoluble complex compound of the heavy metal and of said inositol compound, allowing the reaction to continue for a predetermined time while agitating, and thereafter separating the complex compound and said added inositol compound from the beverage to form the finished product.

2. The process according to claim 1 wherein the inositol compound is added in the proportion of 20 to 60 grams of compound to each hectoliter of beverage and the mixture is thoroughly stirred and allowed to react therewith for 8 to 14 days.

3. The process according to claim 1 wherein the inositol compound is added to the beverage in the form of a slurry.

4. The process according to claim 1 wherein the inositol compound is calcium inositol tetraphosphate.

5. The process of fining vinous and fruit beverages selected from the group consisting of grape wine, fruit wine, grape juice, fruit juice and must, containing at least one contaminating heavy metal, comprising adding to said beverages calcium inositol tetraphosphate in the proportion of 20–60 grams to each hectoliter of beverage to form a substantially insoluble complex compound of the heavy metal and of said inositol compound, continuing the reaction for 8 to 14 days while agitating, thereafter separating the complex compound and said added inositol compound from the beverage thereby producing a fined beverage.

References Cited in the file of this patent

UNITED STATES PATENTS

| | | |
|---|---|---|
| 1,938,999 | Cox | Dec. 12, 1933 |
| 2,239,543 | Andrews | Apr. 22, 1941 |
| 2,310,383 | Andrews | Feb. 9, 1943 |
| 2,322,880 | Pollak | June 29, 1943 |
| 2,493,666 | Gehman | Jan. 3, 1950 |

OTHER REFERENCES

"The Chemical Age," vol. 60, No. 1556 May 7, 1949, pages 679 and 680.

"Textbook of Biochemistry" by E. S. West & W. R. Todd, copyright 1951 by the MacMillan Company, 2d printing New York 1952. Pages 420, 421, 772, 773, 774, 1182, 1183.